United States Patent
Asami

(10) Patent No.: US 8,408,999 B2
(45) Date of Patent: Apr. 2, 2013

(54) GAME APPARATUS, GAME PROCESSING METHOD, AND INFORMATION RECORDING MEDIUM

(75) Inventor: Yuichi Asami, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 101 days.

(21) Appl. No.: 13/051,553

(22) Filed: Mar. 18, 2011

(65) Prior Publication Data

US 2011/0237330 A1     Sep. 29, 2011

(30) Foreign Application Priority Data

Mar. 23, 2010  (JP) ................. 2010-065442

(51) Int. Cl.
- A63F 9/24 (2006.01)
- A63F 13/00 (2006.01)
- G06F 17/00 (2006.01)

(52) U.S. Cl. .............. 463/31; 463/7; 463/30; 463/32; 463/33; 463/34; 463/35

(58) Field of Classification Search ............. 463/7
See application file for complete search history.

(56) References Cited

U.S. PATENT DOCUMENTS

2008/0146312 A1 * 6/2008 Yamazaki et al. ........... 463/20

FOREIGN PATENT DOCUMENTS

| JP | 10-209879 | 8/2000 |
| JP | 2001-299975 | 10/2001 |
| JP | 2004-105220 | 4/2004 |

OTHER PUBLICATIONS

Japanese Office Action with English Translation, mailing date Nov. 22, 2011.

* cited by examiner

Primary Examiner — David L Lewis
Assistant Examiner — Werner Garner
(74) Attorney, Agent, or Firm — Howard & Howard Attorneys PLLC

(57) ABSTRACT

A game apparatus displaying on a screen moves to be made by the player in time with reproduction of a piece of music is provided. In the game apparatus, a reproduction part reproduces music stored in a storage. The music to be reproduced is divided into multiple segments of the same length of time and an image is associated with each of the multiple segments, presenting moves to be made by the player while that segment is reproduced. Multiple regions are provided on the screen. The display part displays an image stored in the storage and associated with a segment i+j−1 among the multiple segments in a region j among the multiple regions on the screen while a segment i among the multiple segments is reproduced by the reproduction part.

13 Claims, 13 Drawing Sheets

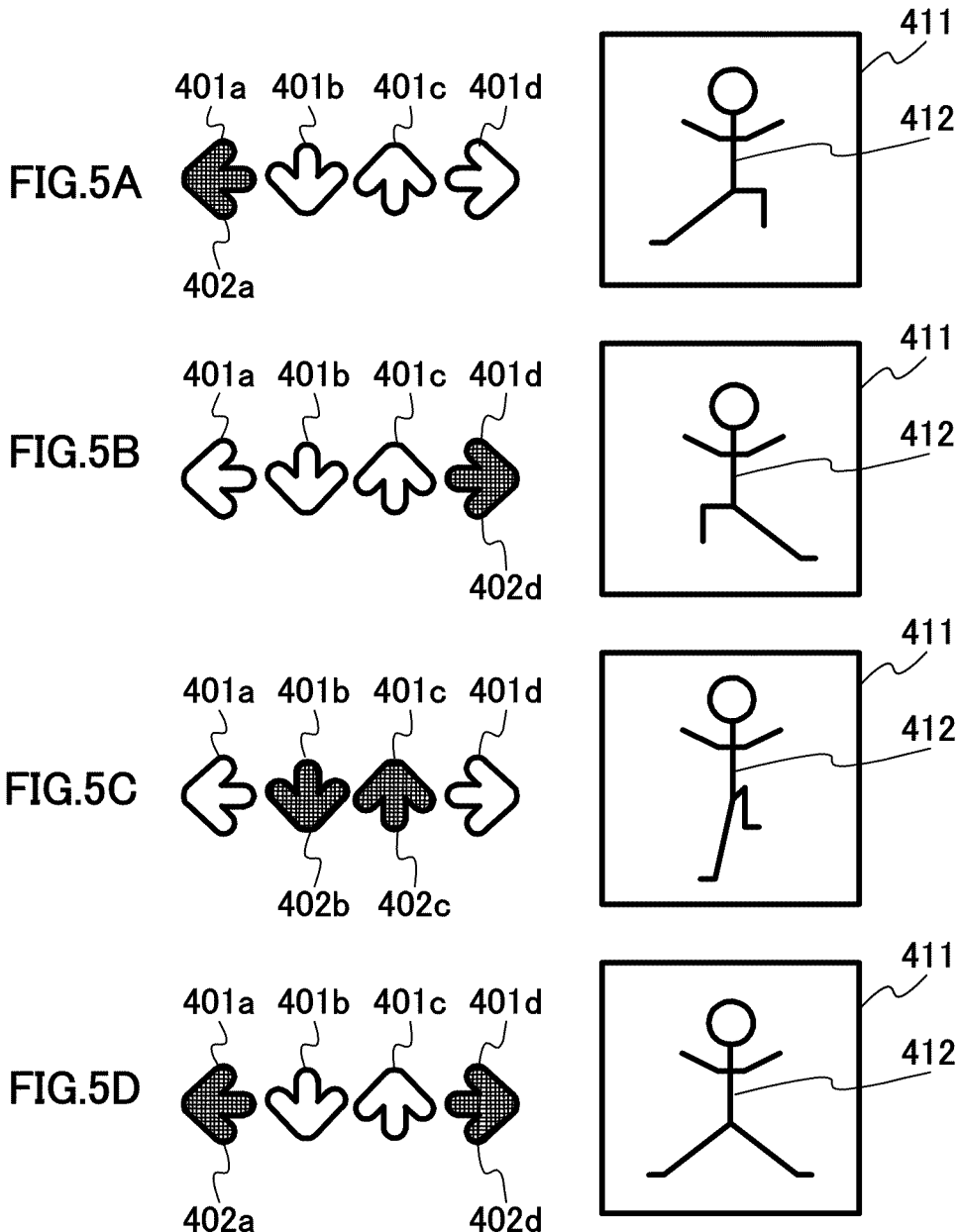

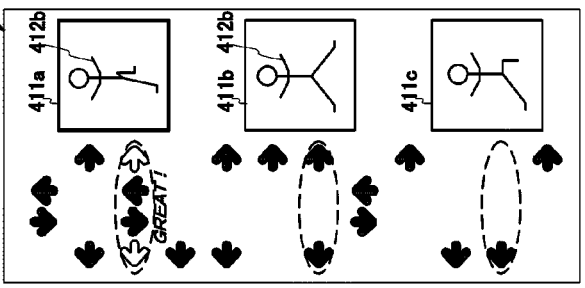
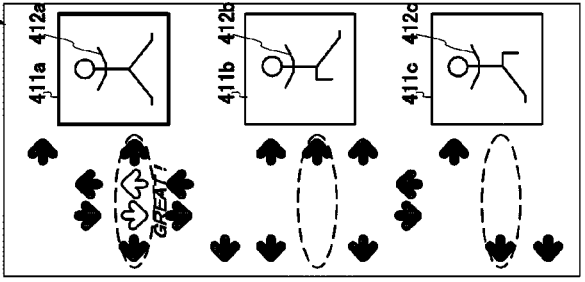
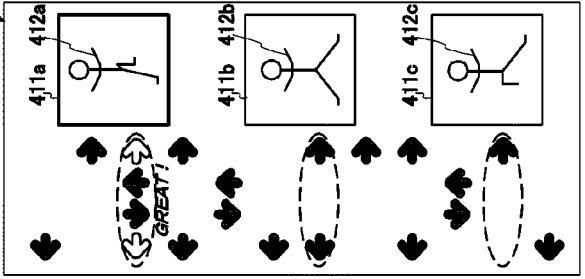
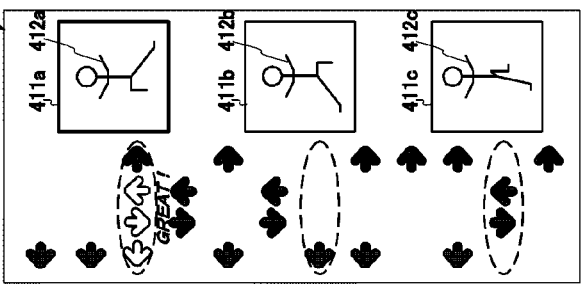
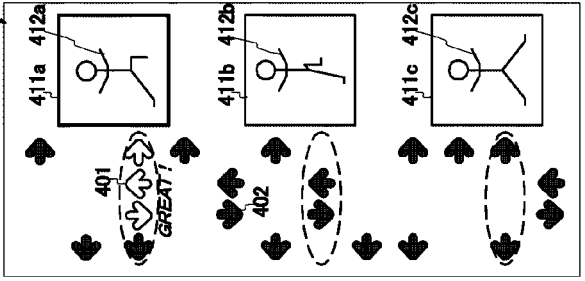

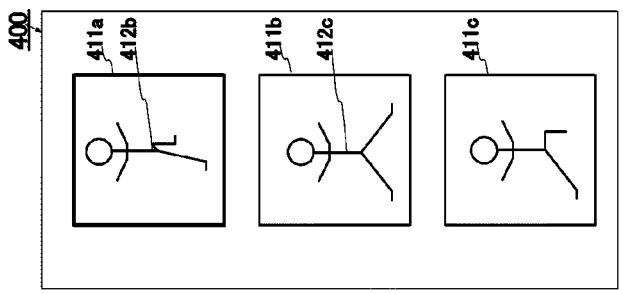
FIG.10A
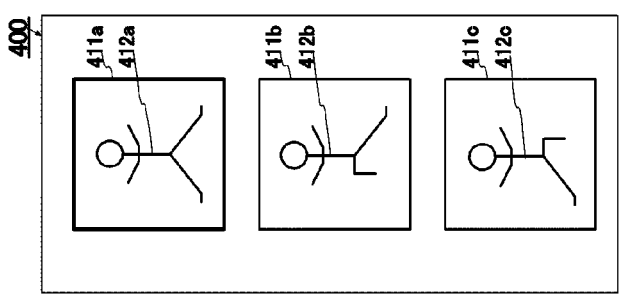
FIG.10B
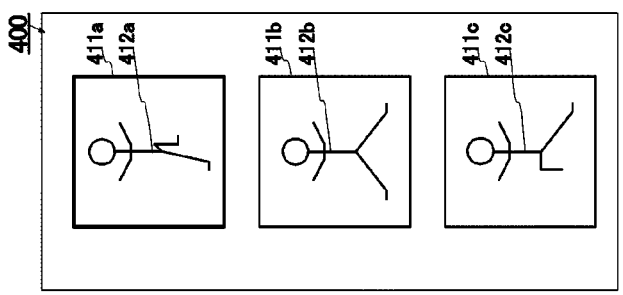
FIG.10C
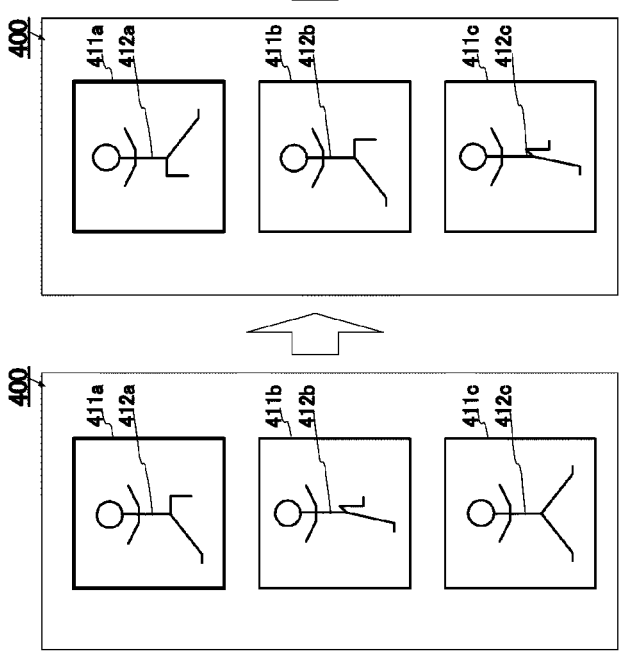
FIG.10D
FIG.10E

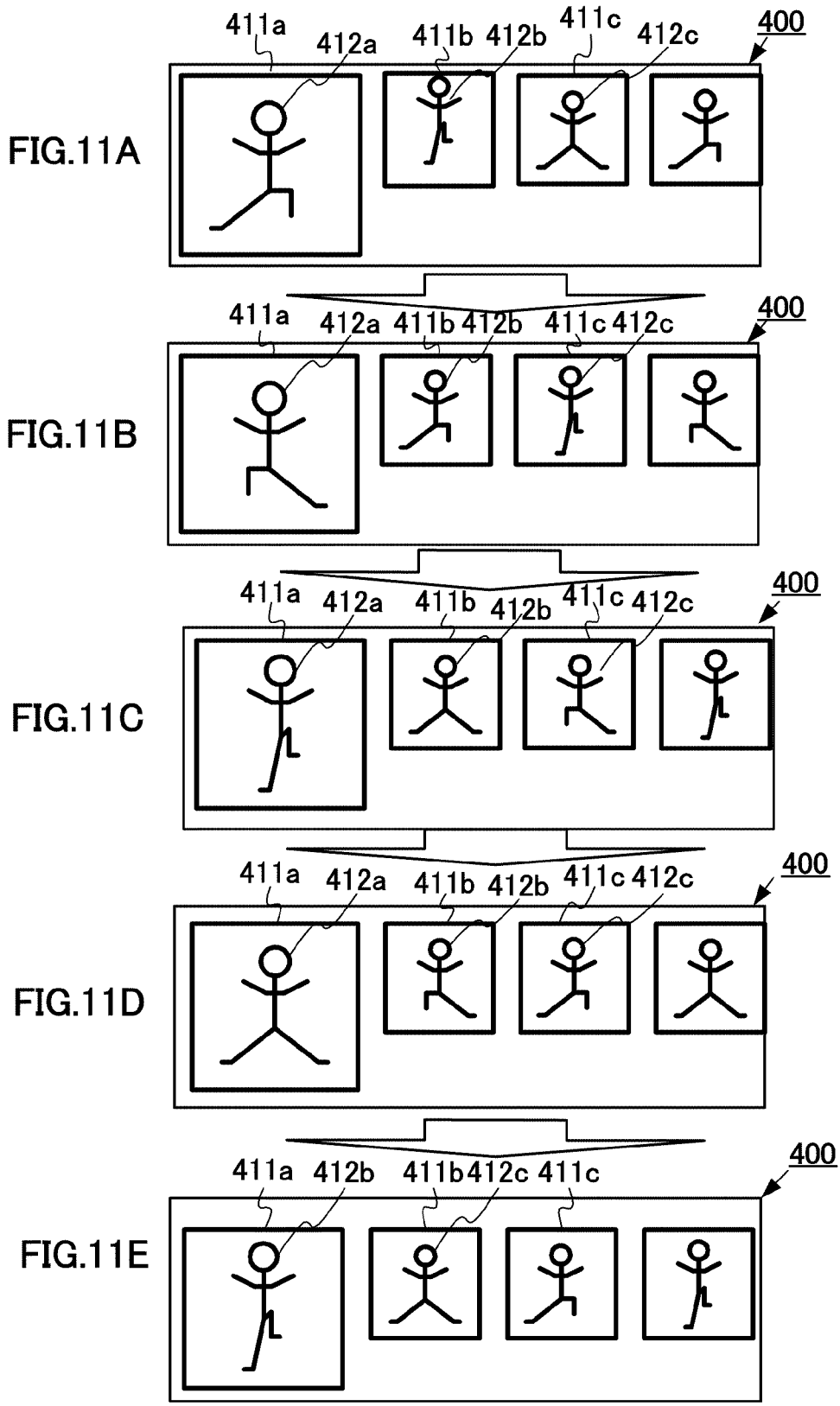

GAME APPARATUS, GAME PROCESSING METHOD, AND INFORMATION RECORDING MEDIUM

CROSS-REFERENCE TO RELATED APPLICATION

This application claims the benefit of Japanese Patent Application No. 2010-65442, filed on Mar. 23, 2010, the entire disclosure of which is incorporated by reference herein.

FIELD

This application relates generally to a game apparatus, game processing method, and information recording medium suitable for properly displaying on a screen moves to be made by the player in time with reproduction of a piece of music.

BACKGROUND

Games in which the player moves his/her entire body to play have extensively become popular. For example, Patent Literature 1 discloses an apparatus displaying on a screen tasks presented by the positions and timing of steps; the player follows the instructions to play and then enjoys dancing. This game apparatus detects the stepping motions of the player and gives the player a score based on the variance between his/her actual stepping motions and the instructions on the positions and timing of steps. Moving his/her body according to the displayed tasks, the player can enjoy dancing to the rhythm of music being reproduced.
Patent Literature 1: Japanese Patent No. 3003851.

However, there is a strong demand from the players that they should be able to see the choreography or moves on the screen to accomplish the tasks. In doing so, a further demand is that the player should be able to see the subsequent choreography or moves.

The present invention is intended to solve the above problems and an exemplary purpose of the present invention is provide a game apparatus, game processing method, and information recording medium suitable for properly displaying on a screen moves to be made by the player in time with reproduction of a piece of music.

SUMMARY

In order to achieve the above purpose, the following invention is disclosed in accordance with the principles of the present invention.

The game apparatus according to an exemplary first aspect of the resent invention includes a reproduction part and a display part.

The reproduction part reproduces a piece of music. The piece of music is divided into multiple segments of the same length of time. An image is associated with each of the multiple segments, presenting moves to be made by the player while that segment is reproduced.

The multiple segments of the same length of time are, for example, measures composing a piece of music. Of a piece of music composed of N measures, one measure corresponds to such a segment; there are N segments of the same length of time.

An image presenting moves to be made by the player is an animated image or a still image properly showing how to move the body according to the displayed task in a game in which the player moves his/her body according to the displayed tasks so as to enjoy dancing to the rhythm of music being reproduced.

For example, a piece of music in quadruple time has four beats in a measure. The player often makes four moves in a measure in time with the beat. An image presenting such moves is displayed to show the player how to move the body in a measure. For a piece of music composed of N measures, N such images are displayed to show the player how to move the body to the music so that the player can overall enjoy dancing to the rhythm of music being reproduced.

The display part displays an image associated with a segment $i+j-1$ among multiple segments in a region $j$ among multiple regions on a screen while the reproduction part reproduces a segment $i$ among multiple segments.

The multiple regions on a screen are regions in which an image properly showing how to move the body is displayed. One of the multiple regions on a display corresponds to one of the multiple segments of the same length of time.

For example, when there are four regions on a screen, an image (animated image or still image) associated with the first segment is displayed in the first region; an image associated with the second segment, in the second region; an image associated with the third segment, in the third region; and an image associated with the fourth segment, in the fourth region, while the first segment of a piece of music is reproduced. Furthermore, an image associated with the tenth segment is displayed in the first region; an image associated with the eleventh segment, in the second region; an image associated with the twelfth segment, in the third region; and an image associated with the thirteenth segment, in the fourth region, while the tenth segment of the piece of music is reproduced.

Consequently, the player can learn the current choreography from the image displayed in the first region, the choreography one measure ahead from the image displayed in the second region, the choreography two measures ahead from the image displayed in the third region, and the choreography three measures ahead from the image displayed in the fourth region.

When the images displayed in the regions are animated images, the animated images are displayed in the same rhythm because the associated segments have the same length of time. Therefore, the player can easily learn four choreographed moves or body movements for the current measure and one, two, and three measures ahead.

With the above structure, the above game apparatus can properly display on a screen moves to be made by the player in time with reproduction of a piece of music. The player can also learn the subsequent choreographed moves or body movements.

In the above game apparatus, the images can be animated images.

In other words, the moves to be made by the player in time with reproduction of a piece of music are presented by animated images. Use of animated images provides direct and specific presentation of moves; the player can easily learn how to move the body.

In the above game apparatus, the images can be still images.

In other words, the moves to be made by the player in time with reproduction of a piece of music are presented by still images, not by animated images. Compared with use of animated images as described above, use of still images makes it simpler to show the moves to be made by the player. For example, it is more proper to use still images where one does not want to take so much time to reproduce animated images, there is no need of specific presentation by animated images, or it is desired to reduce the game processing load.

In the above game apparatus, the multiple regions can be lined up on a screen in the order of reproduction.

For example, as described above, it is assumed that there are four regions on a screen. The screen can be divided vertically into four regions to create first, second, third, and fourth regions from the top.

Consequently, the regions are lined up in the chronological order of reproduction from the top to bottom. The player can learn four choreographed moves or body movements in line for the current measure and one, two, and three measures ahead in the chronological order.

With the above structure, the player can learn the current and subsequent choreographed moves or body movements in line in the chronological order in time with reproduction of a piece of music.

In the above game apparatus, the multiple regions move in line at a given speed while a segment i is reproduced by the reproduction part. After the segment i is reproduced, the regions can be moved or returned to the positions where they were before the reproduction of the segment i started.

For example, as described above, it is assumed that there are four regions on a screen and the first, second, third, and fourth regions are lined up on the screen from the top.

Here, an image (animated image or still image) associated with a segment i will be described. While the segment i−3 of a piece of music is reproduced, the image associated with the segment i is displayed in the fourth region, emerging from the bottom of the screen. Then, it is moved up along the line at a given speed together with the fourth region. Immediately before the segment i−3 of the music finishes, the fourth region has reached the position where the third region was when the segment i−3 of the music started. Then, when the segment i−2 of the music starts, the fourth region returns to the position where it was when the segment i−3 started. The image associated with the segment i is displayed in the third region and moved up along the line at a given speed together with the third region. The above procedures are repeated. The image associated with the segment i is displayed in the second region while the segment i−1 of the music is reproduced and displayed in the first region while the segment i of the music is reproduced, meanwhile being moved up along the line at a given speed together with the respective regions.

Consequently, it seems to the player that the images smoothly keep moving at a given speed in a given direction. The player can learn four choreographed moves or body movements for the current measure and one, two, and three measures ahead from the images that are lined up in the chronological order and smoothly keep moving.

With the above structure, the player can learn the current and subsequent choreographed moves or body movements from the images that are lined up in the chronological order and smoothly keep moving in line at a given speed in time with reproduction of a piece of music.

In the above game apparatus, the display part can display the first region in an intensified manner among the multiple regions.

When an image (animated image or still image) associated with the music segment being reproduced at the time is reproduced in the first region among the multiple regions, the move to be made by the player at the time is presented. With the first region being displayed in an intensified manner, the player can easily distinguish it from the other regions and learn the move he/she should currently make.

In order to achieve the above purpose, the game processing method according to another aspect of the present invention is a game processing method executed in a game apparatus having a reproduction part and a display part and comprising a reproduction step and a display step.

The game apparatus displays on a screen moves to be made by the player in time with reproduction of a piece of music.

The piece of music is divided into multiple segments of the same length of time. An image is associated with each of the multiple segments, presenting moves to be made by the player while that segment is reproduced. Multiple regions are provided on a screen.

In the reproduction step, the reproduction part reproduces a piece of music. In the display step, an image associated with a segment i+j−1 among multiple segments is displayed in a region j among multiple regions on a screen while the reproduction part reproduces a segment i among multiple segments.

In order to achieve the above purpose, the computer-readable information recordable medium in which programs are recorded according to another aspect of the present invention is configured to allow a computer to function as the above game apparatus. Furthermore, the information recording medium according to another aspect of the present invention is configured to allow a computer to execute the above game processing method.

The information recording medium of the present invention is a computer-readable information recording medium such as a compact disc, flexible disc, hard disc, magnetooptical disc, digital video disc, magnetic tape, and semiconductor memory.

Furthermore, the above information recording medium can be distributed/sold separately from the computer.

The present invention can properly display on a screen moves to be made by the player in time with reproduction of a piece of music.

BRIEF DESCRIPTION OF THE DRAWINGS

A more complete understanding of this application can be obtained when the following detailed description is considered in conjunction with the following drawings, in which:

FIG. 5A is an illustration showing a first step of a correspondence between an instruction indicator and a model animated image;

FIG. 5B is an illustration showing a second step of the correspondence between an instruction indicator and a model animated image;

FIG. 5C is an illustration showing a third step of the correspondence between an instruction indicator and a model animated image;

FIG. 5D is an illustration showing a forth step of the correspondence between an instruction indicator and a model animated image;

FIG. 8A is an illustration showing a first step of a chronologically changed game image according to Embodiment 2;

FIG. 8B is an illustration showing a second step of the chronologically changed game image according to Embodiment 2;

FIG. 8C is an illustration showing a third step of the chronologically changed game image according to Embodiment 2;

FIG. 8D is an illustration showing a forth step of the chronologically changed game image according to Embodiment 2;

FIG. 8E is an illustration showing a fifth step of the chronologically changed game image according to Embodiment 2;

FIG. 10A is an illustration showing a first step of a chronologically changed game image according to Embodiment 4;

FIG. 10B is an illustration showing a second step of the chronologically changed game image according to Embodiment 4;

FIG. 10C is an illustration showing a third step of the chronologically changed game image according to Embodiment 4;

FIG. 10D is an illustration showing a forth step of the chronologically changed game image according to Embodiment 4;

FIG. 10E is an illustration showing a fifth step of the chronologically changed game image according to Embodiment 4;

FIG. 11A is an illustration showing a first step of a chronologically changed game image according to Embodiment 5;

FIG. 11B is an illustration showing a second step of the chronologically changed game image according to Embodiment 5;

FIG. 11C is an illustration showing a third step of the chronologically changed game image according to Embodiment 5;

FIG. 11D is an illustration showing a forth step of the chronologically changed game image according to Embodiment 5;

FIG. 11E is an illustration showing a fifth step of the chronologically changed game image according to Embodiment 5;

DETAILED DESCRIPTION

Embodiments of the present invention will be described. For easier understanding, embodiments realizing the present invention in a game information processing apparatus will be described below. The following embodiments are given for the purpose of explanation and do not confine the scope of the invention of the present application. A person of ordinary skill in the field may be able to employ an embodiment in which individual elements or all elements are replaced with something equivalent. Such an embodiment will fall under the scope of the present invention.

Embodiment 1

Figure 1:
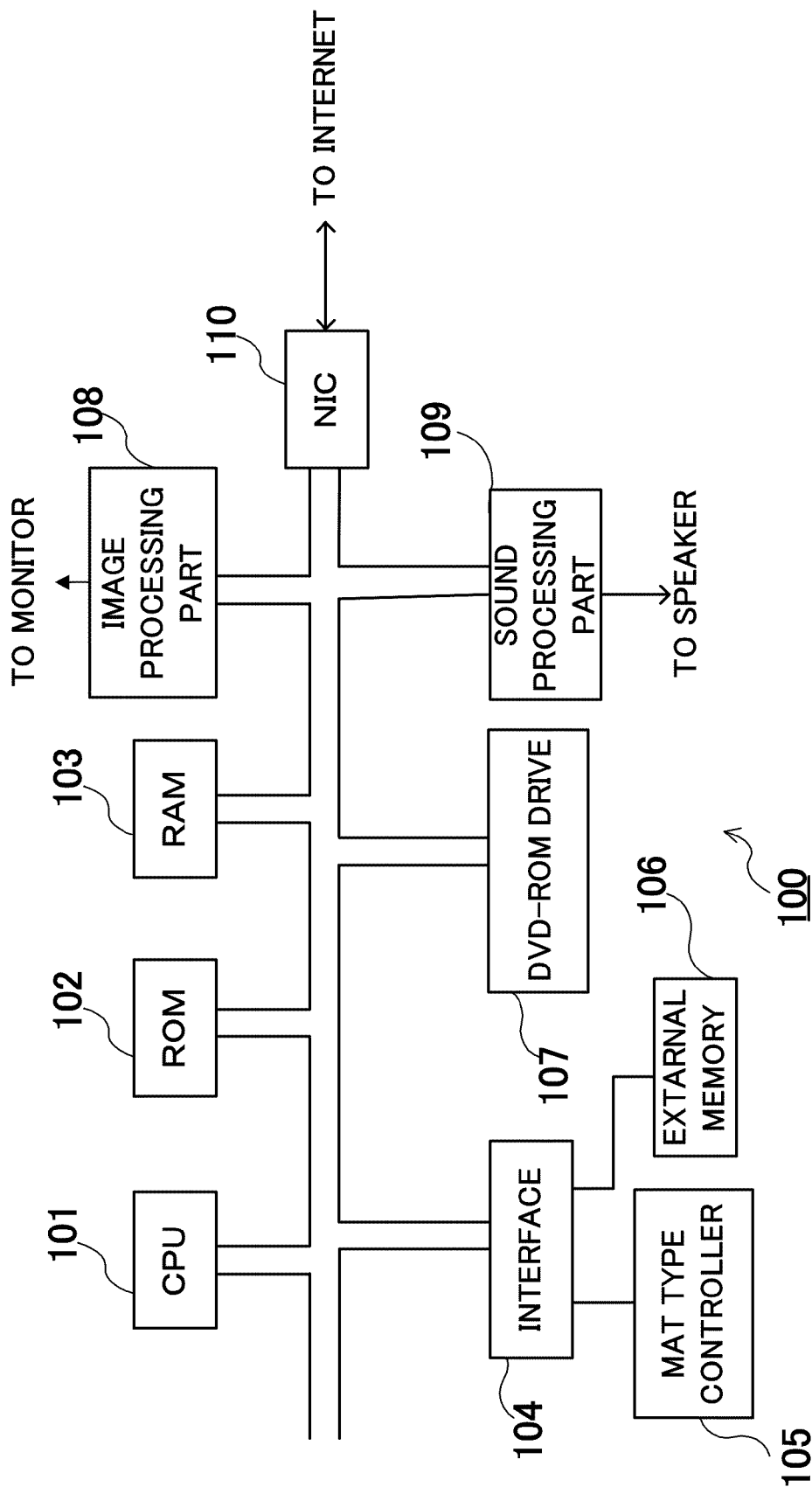
FIG. 1 is a schematic chart showing the general configuration of a typical information processing apparatus realizing the game apparatus of the present invention.

FIG. 1 is a schematic chart showing the general configuration of a typical information processing apparatus functioning as the game apparatus of the present invention. An information processing apparatus 100 according to Embodiment 1 will be described hereafter with reference to this figure.

The information processing apparatus 100 comprises a CPU (central processing unit) 101, a ROM (read only memory) 102, a RAM (random access memory) 103, an interface 104, a mat type controller 105, an external memory 106, a DVD-ROM (digital versatile disk-read only memory) drive 107, an image processing part 108, a sound processing part 109, and an NIC (network interface card) 110.

A DVD-ROM in which game programs and data are recorded is mounted on the DVD-ROM drive 107 and the information processing apparatus 100 is powered on to execute the programs, thereby realizing the game apparatus of this embodiment.

The CPU 101 controls the entire operation of the information processing apparatus 100. The CPU 100 is connected to the components to exchange control signals and data.

An IPL (initial program leader) that is executed immediately after the power-on is recorded in the ROM 102. With the IPL being executed, the programs recorded in the DVD-ROM are read onto the RAM 103 and the CPU 101 starts executing them. Furthermore, operation system programs and various data necessary for operation control of the entire information processing apparatus 100 are recorded in the ROM 102.

The RAM 103 is used to temporarily store data and programs, retaining programs and data read from a DVD-ROM and other data necessary for game progress and chat communication.

The mat type controller 105 connected via the interface 104 receives input of operations by the user in executing a game.

Figure 2:
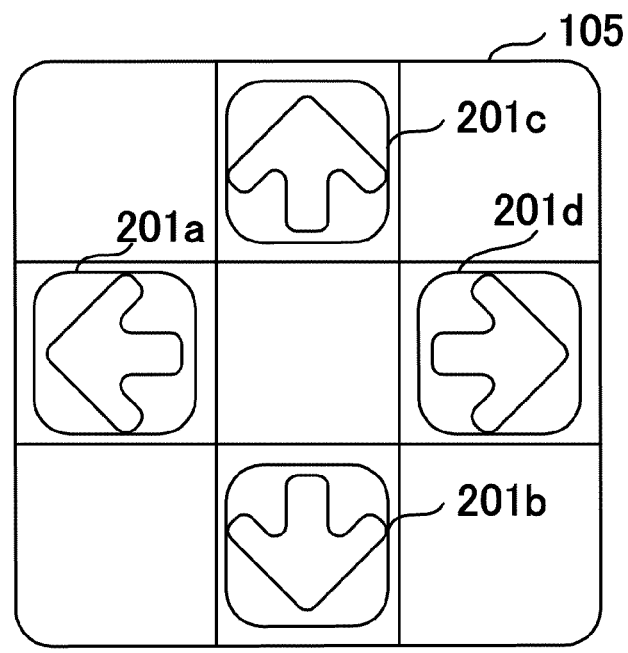
FIG. 2 is an illustration showing a mat type controller.

FIG. 2 is an illustration showing the mat type controller 105. Multiple buttons that are pressed by the player and accordingly change between the pressed state and non-pressed state are provided in given regions on the surface. For example, as shown in this figure, a left button 201a, a bottom button 201b, a top button 201c, and a right button 201d are provided. The mat type controller 105 receives input of operations generally made by the user with a foot. When the user presses these buttons, the input of operation corresponding to the pressed button is received.

In this embodiment, the mat type controller 105 comprises four buttons 201a to 201d. The number of buttons is not restricted to four. Three or less buttons or five or more buttons can be provided. The object used for input of operations is not necessarily laid on the floor and can be a so-called touch pad, which is held in hand for operation, or can be something gripped by hand.

In place of the mat type controller 105, an infrared camera can be used to catch the motion of the entire body of the player as input of operations in executing a game.

In FIG. 1, the external memory 106 detachably connected via the interface 104 stores data presenting the game play states (past scores), data presenting the game progress, and chat communication log(record) data of network games in a rewritable manner. The user can record these data in the external memory 106 as necessary through input of instructions via the mat type controller 105.

Programs for realizing a game and image data and sound data accompanying the game are recorded in a DVD-ROM mounted on the DVD-ROM drive 107. The CPU 101 controls the DVD-ROM drive 107 to read the mounted DVD-ROM, and read out necessary programs and data and temporarily stores them in the RAM 103.

The image processing part 108 processes the data read from the DVD-ROM by means of the CPU 101 and an image arithmetic processor (not shown) provided in the image processing part 108, and records them in a frame memory (not shown) provided in the image processing part 108. The image information recorded in the frame memory is converted to video signals in a given synchronized timely manner and output to a monitor (not shown) connected to the image processing part 108. In this way, various images can be displayed.

The image arithmetic processor can execute two-dimensional image superimposing calculation, transmission calculation such as a blending, and a variety of saturate calculation at a high speed.

The image arithmetic processor can also execute high speed calculation for rendering virtual three-dimensional polygon information including a variety of additional texture information by the Z buffer method so as to obtain a rendering image in which a polygon placed in a virtual three-dimensional space is looked down from a given viewpoint in a given viewing direction.

Cooperation between the CPU 101 and image arithmetic processor makes it possible to depict a character string as a two-dimensional image in a frame memory or on a polygon surface according to font information defining the shape of characters. The font information is recorded in the ROM 102. However, specific font information recorded in a DVD-ROM can be used.

The sound processing part 109 converts sound data read from the DVD-ROM to analog sound signals and outputs them from a speaker (not shown) connected thereto. Furthermore, under the control of the CPU 101, the sound processing part 109 creates sound effects or music data to be generated in the course of a game and outputs the corresponding sound from the speaker.

The NIC 110 is used to connect the information processing apparatus 100 to a computer communication network (not shown) such as the Internet. The NIC 110 is composed of a member complying with 10BASE-T/100BASE-T standards used for LANs (local area networks), an analog modem for connecting to the Internet using telephone lines, an ISDN (integrated services digital network) modem, an ADSL (asymmetric digital subscriber line) modem, or a cable modem for connecting to the Internet using cable television lines, and an interface (not shown) mediating between them and the CPU 101.

Furthermore, the information processing apparatus 100 can utilize a large capacity external storage such as a hard disc to function as the ROM 102, RAM 103, and external memory 106, and a DVD-ROM mounted on the DVD-ROM drive 107.

The functional configuration of the game apparatus of this embodiment will be described hereafter.

A typical game executed by the game apparatus of the present invention is a game in which the player dances to music in a real space. This embodiment will be described hereafter using a dancing game by way of example.

Figure 3:
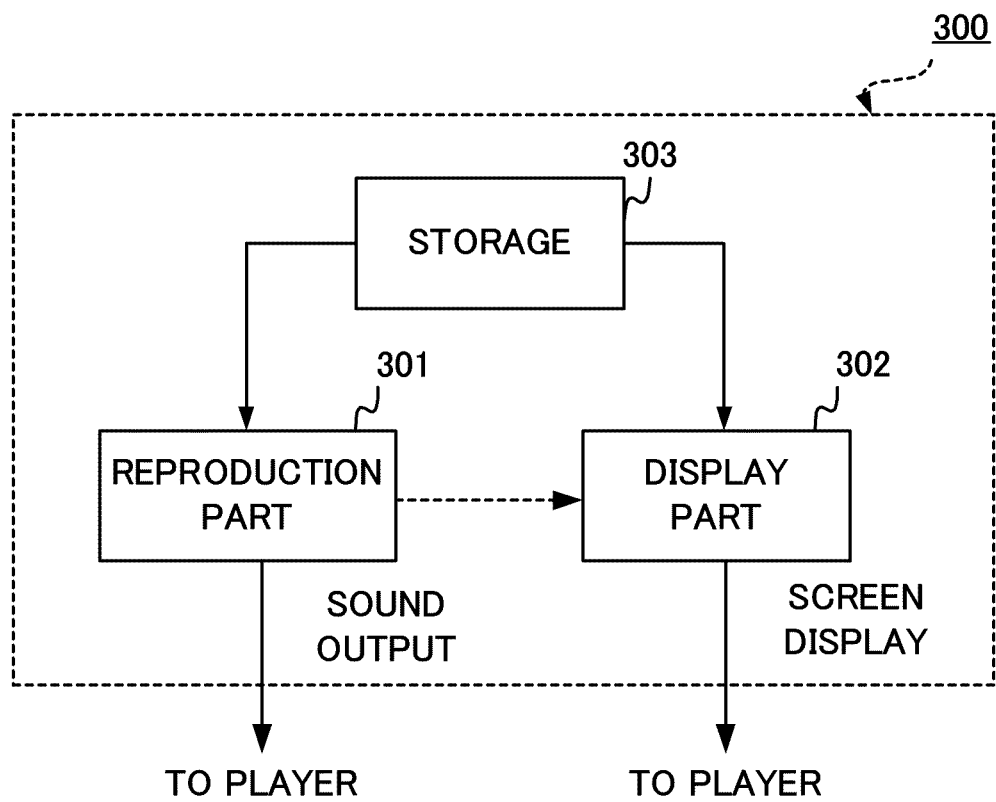
FIG. 3 is an illustration for explaining the general configuration of the game apparatus.

FIG. 3 is an illustration for explaining the general configuration of the game apparatus. As shown in this figure, a game apparatus 300 comprises a reproduction part 301, a display part 302, and a storage 303.

The storage 303 consists of a RAM 103 and the like. For example, necessary programs and data such as music, music information, animated images, and still images recorded in a DVD-ROM mounted on the DVD-ROM drive 107 are read and stored in the storage 303.

The reproduction part 301 reads necessary programs and data such as music and music information stored in the storage 303 and reproduces the music. For example, the reproduction part 301 reproduces music sound based on the music information while the music game is played, supplies sound signals accompanying the reproduction, and outputs the music sound from the speaker. Here, the sound processing part 109 functions as such a reproduction part 301.

The display part 302 reads necessary programs and data such as animated images and still images stored in the storage 303 as necessary and reproduces game images. Here, the image display part 108 functions as such a display part 302.

Figure 4:
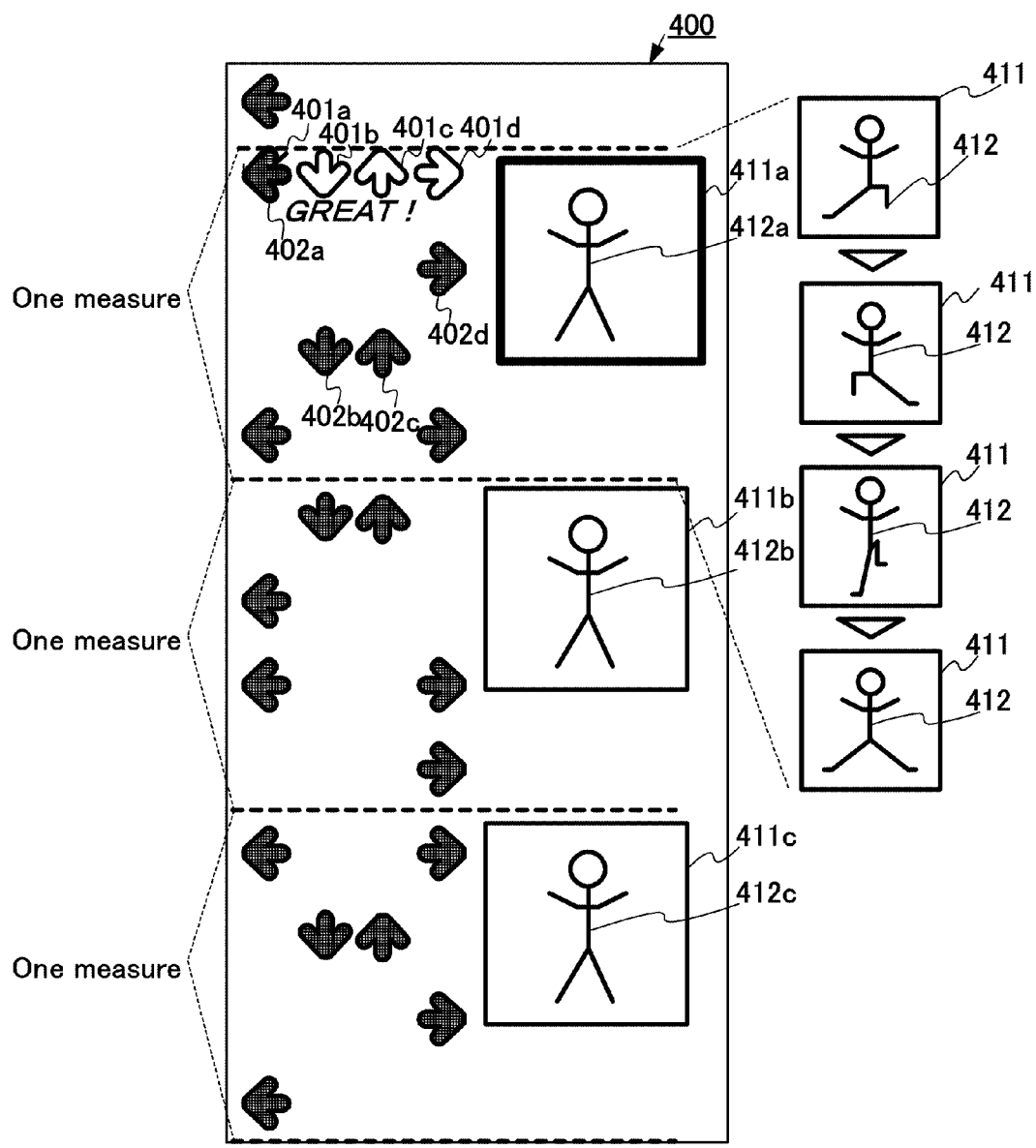
FIG. 4 is an illustration showing exemplary game images according to Embodiment 1.

FIG. 4 shows exemplary game images according to Embodiment 1. The display part 302 generates game images as shown in this figure. In other words, multiple display regions 411 (411a, 411b, 411c) are provided on a screen 400. Model animated images 412 (412a, 412b, 412c), which present the moves to be made by the player while a corresponding segment of a piece of music divided into multiple segments of the same length of time is reproduced, are displayed in the display regions 411. Here, the multiple segments of the same length of time correspond to the measures composing a piece of music by way of example. As shown in the figure, reference indicators 401 (401a, 401b, 401c, 401d) depicted at fixed given positions on the screen 400, instruction indicators 402 (402a, 402b, 402c, 402d in the figure) depicted at positions moving with time, and other background images (not shown) are displayed on the screen 400.

The instruction indicators 402 correspond to the buttons provided on the mat type controller 105. Up-arrow, down-arrow, right-arrow, and left-arrow images are depicted on the mat type controller 105. More specifically, a left-arrow image (402a) is depicted on the left button (201a) of the mat type controller 105; a down-arrow image (402b), on the bottom button (201b); an up-arrow image (402c), on the top button (201c); and a right-arrow image (402d), on the right button (201d).

As for the reference indicators 401, the reference indicators 401a to 401d correspond to the controller buttons 201a to 201d, respectively, in the same manner as the instruction indicators 402. The up-arrow, down-arrow, left-arrow, and right-arrow images of the reference indicators 401 are depicted at given positions on the screen 400.

The instruction indicators 402 are scrolled from the bottom to top in time with the music being reproduced. When the instruction indicators 402 are scrolled up to the same positions as the reference indicators 401, the player presses with a foot the button corresponding to the arrowed direction depicted by the reference indicators 401. In doing so, the player can do model (standard) dance steps to the music being reproduced.

In this embodiment, the display regions 411 are provided on the screen 400. Three display regions 411a, 411b, and 411c are lined up on the screen 400 from the top. The display regions 411a to 411c are each associated with a segment corresponding to one measure of the music being reproduced. Assuming that a measure corresponding to a segment i is currently reproduced, the display region 411a is associated with the measure corresponding to the segment i, the display region 411b is associated with the measure corresponding to the segment i+1, and the display region 411c is associated with the measure corresponding to the segment i+2.

Here, three display regions 411 are provided on the screen 400 for the purpose of explanation. Two display regions 411 or more display regions 411 can be provided.

Model animated images 412 are displayed in the display regions 411. The model animated images 412 are also each associated with a segment corresponding to one measure of the music being reproduced. Assuming that a measure corresponding to a segment i is currently reproduced, a model animated image 412a associated with the segment i is displayed in the display region 411a, a model animated image 412b associated with the segment i+1 is displayed in the display region 411b, and a model animated image 412c associated with the segment i+2 is displayed in the display region 411c.

The model animated images 412a to 412c present moves to be made by the player in the corresponding measures in animated images. In other words, the model animated images display moves of the player pressing with a foot in accordance with the instruction indicators 402 during the corresponding measure, whereby the player can do model (standard) dance steps to the music being reproduced. In this regard, details will be described below.

FIG. 5 shows the correspondence between the instruction indicators 402 and the moves in the model animated images 412. In FIG. 5A, the instruction indicator 402 indicates the left (402a) and the model animated image 412 presents a move of the player stepping on the left button 201a of the mat type controller 105 with the left foot. In FIG. 5B, the instruction indicator 402 indicates the right (402d) and the model animated image 412 presents a move of the player stepping on the right button 201d of the mat type controller 105 with the right foot. In FIG. 5C, the instruction indicator 402 indicates the up and down simultaneously (402b, 402c) and the model animated image 412 presents a move of the player stepping on the top button 201c and bottom button 201b of the mat type controller 105 with both feet simultaneously. In FIG. 5D, the instruction indicator 402 indicates the left and right simultaneously (402a, 402d) and the model animated image 412 presents a move of the player stepping on the left button 201a and right button 201d of the mat type controller 105 with both feet simultaneously.

In this embodiment, the moves are not restricted to the above four patterns. The moves can include, for example, stepping on two, left and top, buttons simultaneously, stepping on three, left, right, and top, buttons simultaneously, and stepping on four, left, right, top, and bottom, buttons simultaneously.

Based on the above-described correspondence, the model animated images 412 show model moves to the player. For example, in FIG. 4, for music having four beats per measure, the model animated images 412 show four moves corresponding to four different instruction indicators 402 in a measure. In the model animated image 412a, the instruction indicators 402 indicate the left on the first beat, the right on the second beat, the up and down on the third beat, and the right and left on the fourth beat. Then, as shown in FIGS. 5A to 5D, the images shown in FIG. 5A, FIG. 5B, FIG. 5C, and FIG. 5D are reproduced in this order. Similarly in the model animated images 412b and 412c, the model animated images 412 corresponding to the instruction indicators 402 for the associated measures are reproduced.

In this embodiment, as shown in FIG. 4, the display region 411a is intensified. More specifically, the display region 411a has thicker frame borders. The display region 411a can be intensified in various manners such as colored differently, brightened, blinked, or enlarged in comparison with the other display regions 411b and 411c.

The model animated image 412a associated with the music segment being reproduced at the time is reproduced in the display region 411a, presenting the move to be made by the player at the time. With the display region 411a being intensified, the player can easily distinguish it from the other display regions (411b and 411c) and learn the move he/she should currently make.

FIGS. 6A to 6E are illustrations showing chronologically changed game images according to Embodiment 1. FIGS. 6A to 6E show the screen 400 changed on each beat of music having four beats per measure. More specifically, FIG. 6A corresponds to the first beat of a measure (a measure i) of music being reproduced, FIG. 6B corresponds to the second beat of the same measure, FIG. 6C corresponds to the third beat of the same measure, FIG. 6D corresponds to the fourth beat of the same measure, and the FIG. 6E corresponds to the first beat of the next measure (a measure i+1).

In this embodiment, the model animated images 412 each associated with a measure of music are smoothly scrolled up on the screen 400 in time with reproduction of the music. Therefore, the three display regions 411a to 411c lined up from the top to bottom on the screen 400 (other display regions 411 also appear on the screen 400 depending on the positions of the display regions 411) are properly moved so that it seems to the player that the model animated images 412 displayed in the display regions 411a to 411c are scrolled. In other words, the display regions 411a to 411c are moved as shown in FIGS. 6A to 6E described below.

Figure 6E:
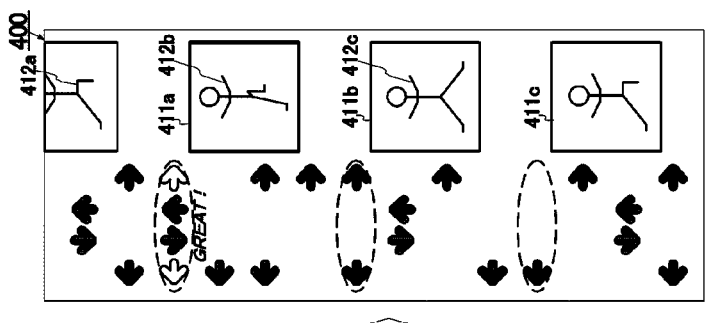
FIG. 6E is an illustration showing a fifth step of the chronologically changed game image according to Embodiment 1.
Figure 6D:
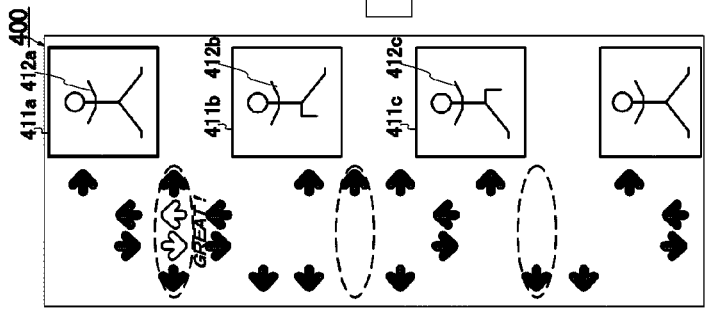
FIG. 6D is an illustration showing a forth step of the chronologically changed game image according to Embodiment 1.
Figure 6C:
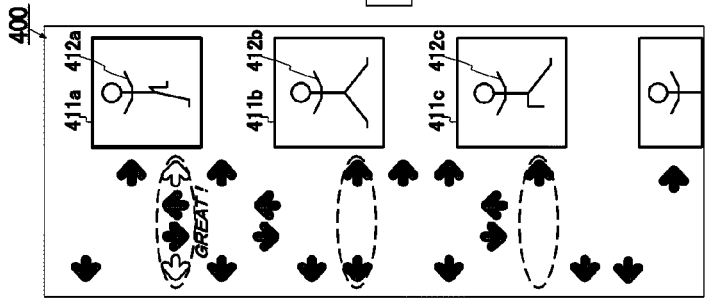
FIG. 6C is an illustration showing a third step of the chronologically changed game image according to Embodiment 1.
Figure 6B:
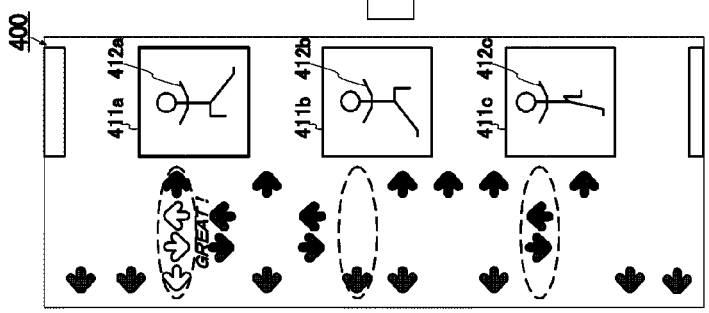
FIG. 6B is an illustration showing a second step of the chronologically changed game image according to Embodiment 1.
Figure 6A:
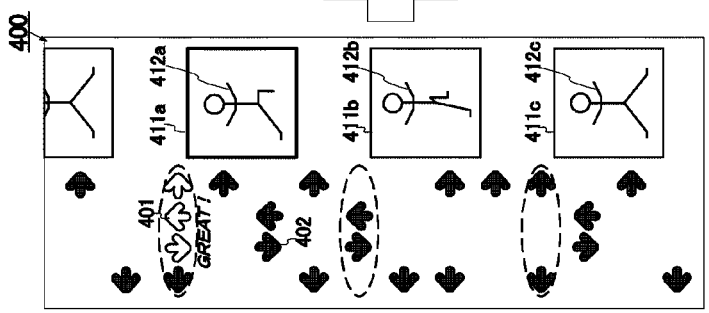
FIG. 6A is an illustration showing a first step of a chronologically changed game image according to Embodiment 1.

In FIG. 6A, the first beat of a measure i of a piece of music is reproduced. The instruction indicator 402 indicates the left. Then, the model animated image 412a displayed in the display region 411a displays a model animated image 412a presenting a move of the player stepping on the left of the mat type controller 105 with the left foot. Similarly, the model animated image 412b displayed in the display region 411b displays a model animated image 412b corresponding to the instruction indicator 402 (the up and down) for the first beat of the measure i+1. The model animated image 412c displayed in the display region 411c displays a model animated image 412c corresponding to the instruction indicator 402 (the left and the right) for the first beat of the measure i+2.

Subsequently, in FIG. 6B, the second beat of the measure i of the music is reproduced. The display regions 411a to 411c are scrolled up the same distance as the instruction indicators 402 in comparison with FIG. 6A. The model animated images 412a to 412c displayed in the display regions 411a to 411c are scrolled as well. Here, the instruction indicator 402 for the second beat of the measure i indicates the right. Then, the model animated image 412a displayed in the display region 411a displays a model animated image 412a presenting a move of the player stepping on the right of the mat type controller 105 with the right foot. Similarly, the model animated image 412*b* displayed in the display region 411*b* displays a model animated image 412*b* corresponding to the instruction indicator 402 (the left) for the second beat of the measure i+1. The model animated image 412*c* displayed in the display region 411*c* displays a model animated image 412*c* corresponding to the instruction indicator 402 (the up and down) for the second beat of the measure i+2.

In FIG. 6C, the third beat of the measure i of the music is reproduced. The display regions 411*a* to 411*c* are scrolled up the same distance as the instruction indicators 402 in comparison with FIG. 6B. The model animated images 412*a* to 412*c* displayed in the display regions 411*a* to 411*c* display the model animated images 412 corresponding to the instruction indicators 402 for the third beat of the measures i, i+1, and, i+2, respectively.

In FIG. 6D, the fourth beat of the measure i of the music is reproduced. The display regions 411*a* to 411*c* are scrolled up the same distance as the instruction indicators 402 in comparison with FIG. 6C. The model animated images 412*a* to 412*c* displayed in the display regions 411*a* to 411*c* display the model animated images 412 corresponding to the instruction indicators 402 for the fourth beat of the measures i, i+1, and, i+2, respectively.

In FIG. 6E, the first beat of the measure i+1 of the music is reproduced. The display regions 411*a* to 411*c* are moved to the same positions as the display regions 411*a* to 411*c* in FIG. 6A. Namely, they are returned. On the other hand, the model animated images 412*a* to 412*c* are displayed in the display regions 411 one level higher in comparison with FIG. 6A. More specifically, the model animated image 412*b* is displayed in the display region 411*a*, the model animated image 412*c* is displayed in the display region 411*b*, and the model animated image 412*a* is displayed in a region one level higher than the display region 411*a*.

In this way, the three display regions 411*a* to 411*c* lined up on the screen 400 are moved up/down in a cycle of a measure of music. It seems to the player that the model animated images 412 keep moving along the line at a given speed. Consequently, the player can easily learn the subsequent choreographed moves or body movements to make.

Figure 7:
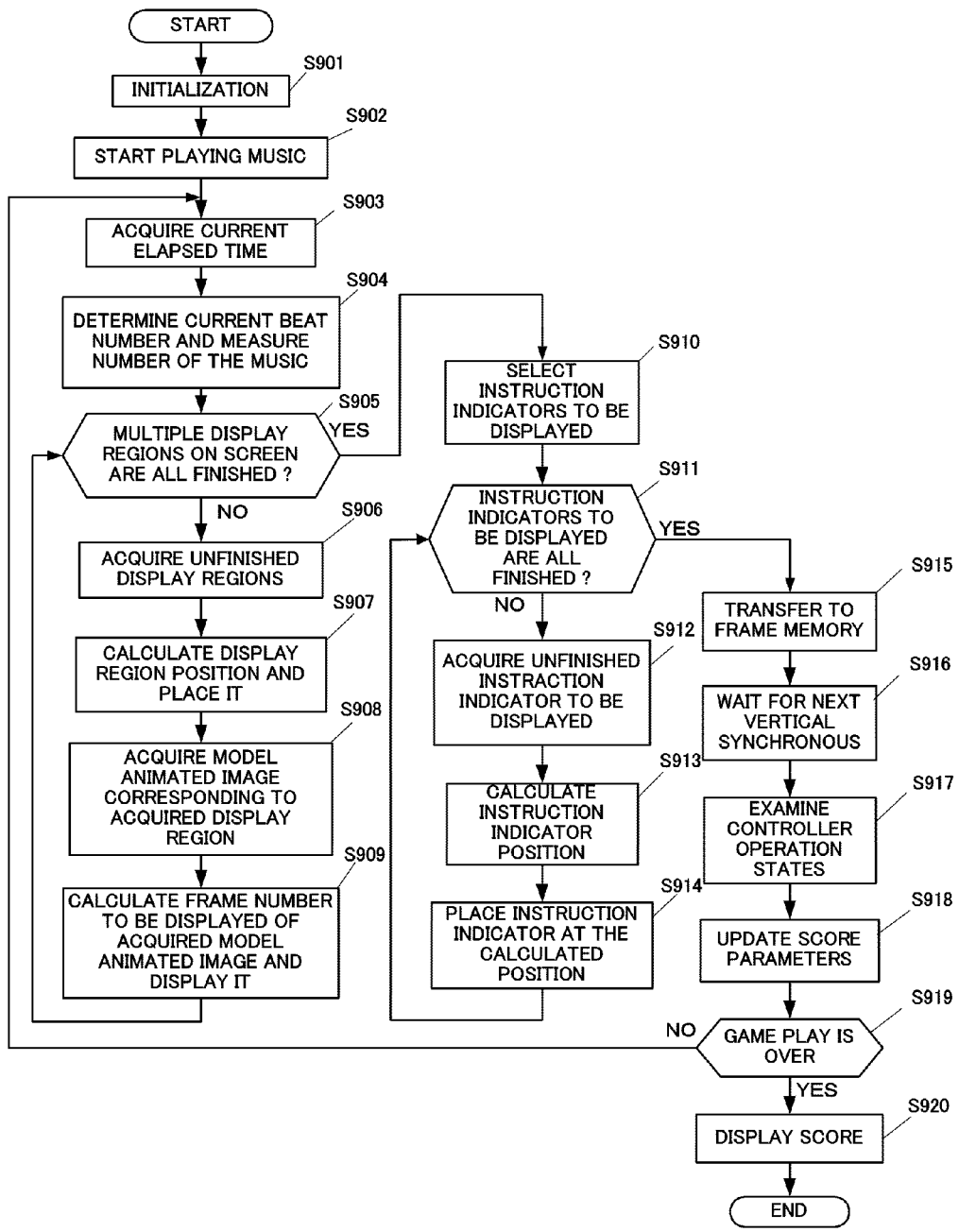
FIG. 7 is a flowchart showing the process according to Embodiment 1.

FIG. 7 is a flowchart showing the process executed in the game apparatus 300 according to Embodiment 1. The following explanation will be made with reference to this figure.

First, the CPU 101 of the game apparatus 300 executes a variety of initialization (Step S901). The initialization includes selection of a piece of music to which the player will dance, and reading of various data such as the music, reference indicators 401, instruction indicators 402, display regions 411, model animated images 412, and other various objects provided on the screen 400. The initialization further includes reading of the length of time of a measure (S), the number of measures (N), and the number of beats per measure (H) of the music, the width of the entire screen 400 (D) (pixels), the number of frames per second of N model animated images (F) (frames/second), S×F pieces of image information per model animated image 412, time of appearance of the instruction indicators 402 on the screen 400 (T), and scroll speed (V) (pixels/second).

Then, the CPU 101 of the game apparatus 300 instructs the sound processing part 109 to start playing the music selected in the initialization (Step S902). The sound processing part 109 functions as the reproduction part 301 under the control of the CPU 101.

The music data can be prepared as various sound data such as MIDI (musical instrument digital interface) data, PCM (pulse coded modulation) data, MP3 (MPEG audio layer-3) data, and OggVorbis data. The data are stored in a DVD-ROM mounted on the DVD-ROM drive 107.

Then, the CPU 100 acquires the elapsed time t up to the current time since the start of playing the music (Step S903). As described later, this process has a loop structure and one loop is equal to the vertical synchronization period. Therefore, the elapsed time t can be obtained by counting the loops using a counter variable prepared in a given region of the RAM 103.

Furthermore, the elapsed time t can also be obtained by acquiring the quantity of sound data expanded, reproduced, and output up to the current time since the start of playing the music data. The sound data are eventually output at 44 kHz, 48 kHz, or 96 kHz. It is easy to obtain the elapsed time t from the quantity of sound data eventually output to the speaker.

The CPU 101 divides the current time t by the length of time of a measure S to yield a quotient i and a remainder A (seconds). The CPU 101 will know that the measure i of the music is currently reproduced from the quotient i and that the beat H×A/S in the measure is played from the remainder A (Step S904).

Then, the following procedure is repeated for each of the multiple display regions 411 on the screen 400 (Steps S905 to S909). When the repetition starts, in other words when there are any unfinished display regions among the multiple display regions 411 on the screen 400 (Step S905; NO), the CPU 101 acquires one of the unfinished display regions 411 (Step S906) and places that display region 411 on the screen 400 at a position moved up by V×A (pixels) from the position where it was when the measure started (Step S907).

Then, a corresponding model animated image 412 is acquired in the placed display region 411 (Step S908). Here, if the display region 411 is a display region j, a model animated image associated with the measure i+j−1 is acquired.

Furthermore, the image in the frame F×A of the selected model animated image 412 is displayed in the display region 411 (Step S909), returning to Step S905.

After the repetition is over (Step S905; YES), the CPU 101 compares the time T at which the instruction indicators 402 obtained in the initialization appear at the start positions or the time T+D/V at which they disappear at the end positions with the current time, and selects all instruction indicators 402 satisfying T≦t≦T+D/V (Step S910).

The following procedure is repeated for each of the selected instruction indicators 402 (Steps S911 to S914). When the repetition starts, in other words, when there are any unfinished instruction indicators 402 among the selected instruction indicators 402 (Step S911; NO), one of the unfinished instruction indicators 402 is acquired (Step S912) and the position of the instruction indicator 402 is calculated from the elapsed time t (Step S913).

The object of the instruction indicator 402 is placed at the position calculated as the position of the instruction indicator 402 (Step S914), returning to Step S911. The orientation of the object is determined as described above.

After the repetition is over (Step S911; YES), the CPU 101 generates images by means of the image processing part 108 and transfers them to the frame memory (Step S915).

The CPU 101 waits until the next vertical synchronous interrupt occurs (Step S916). Then, in sync with the vertical synchronous interrupt, the image data stored in the frame memory are displayed on the monitor. The CPU 101 functions as the display part 302 in cooperation with the image processing part 108 and others.

Immediately after the vertical synchronous interrupt occurs, the CPU 101 examines the operation states of the mat type controller 105 and determines the operation states of the buttons 201a, 201b, 201c, and 201d (Step S917).

The player's score parameters are updated according to whether the buttons 201a, 201b, 201c, and 201d are pressed in a given timely manner (Step S918).

Then, it is determined whether the game play is over (Step S919) and, if not (Step S919; NO), returning to Step S903. On the other hand, if it is over (Step S919; YES), the score of the play of this time is properly displayed (Step S920) and the process ends.

With the above process, this embodiment properly displays the moves to be made by the player on the screen 400 using the instruction indicators 402 and the model animated images 412 displayed in the display regions 411, which are scrolled in time with the music being reproduced.

With the above configuration, the moves to be made by the player are properly displayed on the screen 400 in time with reproduction of the music and furthermore the layer can learn the subsequent choreographed moves or body movements to make.

Embodiment 2

Embodiment 2 of the present invention will be described hereafter. In Embodiment 1, the display regions 411 are scrolled as the music is reproduced. Consequently, the model animated images 412 displayed in the display regions seem to be scrolled at the same speed as the instruction indicators 402. In this embodiment, the instruction indicators 402 are scrolled as the music is reproduced. However, the display regions 411 are fixed at given positions on the screen 400, not scrolled. In this regard, details will be described below.

FIGS. 8A to 8E are illustrations showing chronologically changed game images according to Embodiment 2. As in FIGS. 6A to 6E, FIGS. 8A to 8E show the screen 400 changed on each beat of music having four beats per measure. More specifically, FIG. 8A corresponds to the first beat of a measure (a measure i) of music being reproduced, FIG. 8B corresponds to the second beat of the same measure, FIG. 8C corresponds to the third beat of the same measure, FIG. 8D corresponds to the fourth beat of the same measure, and the FIG. 8E corresponds to the first beat of the next measure (a measure i+1).

In FIG. 8A, the first beat of a measure i of a piece of music is reproduced. The instruction indicator 402 indicates the left. Then, the model animated image 412a displayed in the display region 411a displays an animated image presenting a move of the player stepping on the left of the mat type controller 105 with the left foot. The model animated image 412b displayed in the display region 411b displays a model animated image 412 corresponding to the instruction indicator 402 (the up and down) for the first beat of the measure i+1. The model animated image 412c displayed in the display region 411c displays a model animated image 412 corresponding to the instruction indicator 402 (the left and right) for the first beat of the measure i+2.

In FIG. 8B, the second beat of the measure i of the music is reproduced. The display regions 411a to 411c stay at the same positions as in FIG. 8A and only the instruction indicators 402 are scrolled. The model animated images 412a to 412c displayed in the display regions 411a to 411c also stay at the same positions as in FIG. 8A. Here, the instruction indicator 402 for the second beat of the measure i indicates the right. Then, the model animated image 412a displayed in the display region 411a displays a model animated image 412a presenting a move of the player stepping on the right of the mat type controller 105 with the right foot. Similarly, the model animated image 412b displayed in the display region 411b displays a model animated image 412b corresponding to the instruction indicator 402 (the left) for the second beat of the measure i+1. The model animated image 412c displayed in the display region 411c displays a model animated image 412c corresponding to the instruction indicator 402 (the up and down) for the second beat of the measure i+2.

In FIG. 8C, the third beat of the measure i of the music is reproduced. The display regions 411a to 411c stay at the same positions as in FIGS. 8A and 8B and only the instruction indicators 402 are scrolled. The model animated images 412a to 412c displayed in the display regions 411a to 411c also stay at the same positions as in FIG. 8B and display the model animated images 412 corresponding to the instruction indicators 402 for the third beat of the measures i, i+1, and, i+2, respectively.

In FIG. 8D, the fourth beat of the measure i of the music is reproduced. The display regions 411a to 411c stay at the same positions as in FIGS. 8A to 8C and only the instruction indicators 402 are scrolled. The model animated images 412a to 412c displayed in the display regions 411a to 411c also stay at the same positions as in FIG. 8C and display the model animated images 412 corresponding to the instruction indicators 402 for the fourth beat of the measures i, i+1, and, i+2, respectively.

In FIG. 8E, the first beat of the measure i+1 of the music is reproduced. The display regions 411a to 411c stay at the same positions as in FIGS. 8A to 8D. On the other hand, the model animated images 412a to 412c are moved up to the display regions 411 one level higher in comparison with FIGS. 8A to 8D. More specifically, the model animated image 412b is moved to the display region 411a, the model animated image 412c is moved to the display region 411b, and the model animated image 412a is moved to a display region 411 one level higher than the display region 411a.

Consequently, the model animated image 412 associated with the measure currently being reproduced is displayed in the display region 411a always fixed on the screen 400.

As described above, in this embodiment, the instruction indicators 402 are scrolled as the music is reproduced while the display regions 411 are fixed at given positions on the screen 400, not scrolled. Therefore, the player can learn the moves to make from the model animated images 412 without moving his/her line of sight.

Embodiment 3

Embodiment 3 of the present invention will be described. In Embodiment 1, the instruction indicators 402 and display regions 411 are both displayed on the screen 400. In this embodiment, the instruction indicators 402 are not displayed on the screen 400. Only the display regions 411 and model animated images 412 displayed therein are displayed on the screen 400. In this regard, details will be described below.

FIGS. 9A to 9E are illustrations showing chronologically changed game images according to Embodiment 3. As in FIGS. 6A to 6E and 8A to 8E, FIGS. 9A to 9E show the screen 400 changed on each beat of music having four beats per measure. More specifically, FIG. 9A corresponds to the first beat of a measure (a measure i) of a piece of music being reproduced, FIG. 9B corresponds to the second beat of the same measure, FIG. 9C corresponds to the third beat of the same measure, FIG. 9D corresponds to the fourth beat of the same measure, and the FIG. 9E corresponds to the first beat of the next measure (a measure i+1).

Figure 9A:
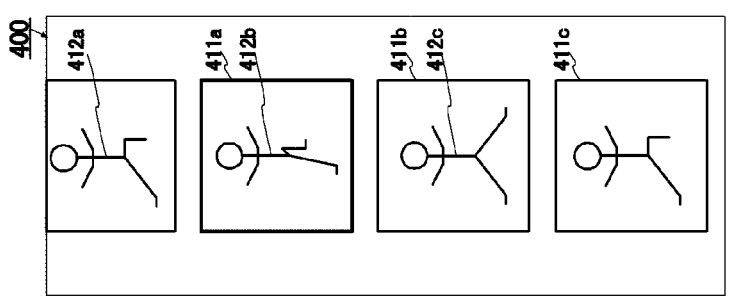
FIG. 9A is an illustration showing a first step of a chronologically changed game image according to Embodiment 3.

In FIG. 9A, the first beat of a measure i of a piece of music is reproduced. The model animated image 412a displayed in the display region 411a displays a model animated image 412a for the first beat of the measure i, namely a model animated image 412a presenting a move of the player stepping on the left of the mat type controller 105 with the left foot. Similarly, the model animated image 412b displayed in the display region 411b displays a model animated image 412b for the first beat of the measure i+1. The model animated image 412c displayed in the display region 411c displays a model animated image 412c for the first beat of the measure i+2.

Figure 9B:
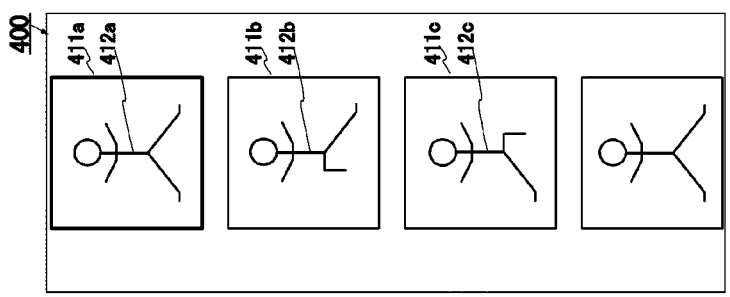
FIG. 9B is an illustration showing a second step of the chronologically changed game image according to Embodiment 3.

In FIG. 9B, the second beat of the measure i of the music is reproduced. The display regions 411a to 411c are scrolled as the music is reproduced in comparison with the positions in FIG. 9A. The model animated images 412a to 412c displayed in the display regions 411a to 411c are also similarly scrolled. Here, the model animated image 412a displayed in the display region 411a displays a model animated image 412a for the second beat of the measure i, namely a model animated image 412a presenting a move of the player stepping on the right of the mat type controller 105 with the right foot. Similarly, the model animated image 412b displayed in the display region 411b displays a model animated image 412b for the second beat of the measure i+1. The model animated image 412c displayed in the display region 411c displays a model animated image 412c for the second beat of the measure i+2.

Figure 9C:
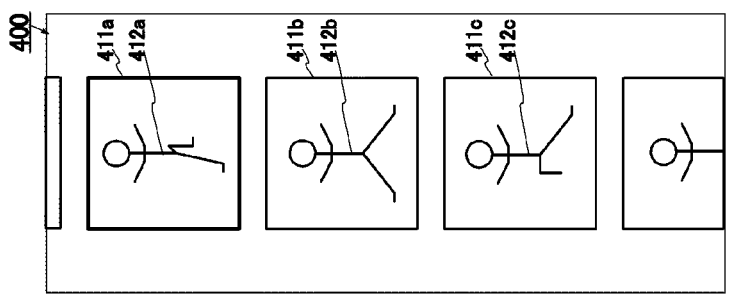
FIG. 9C is an illustration showing a third step of the chronologically changed game image according to Embodiment 3.

In FIG. 9C, the third beat of the measure i of the music is reproduced. The display regions 411a to 411c are scrolled as the music is reproduced in comparison with the positions in FIG. 9B. The model animated images 412a to 412c displayed in the display regions 411a to 411c display the model animated images 412 for the third beat of the measures i, i+1, and, i+2, respectively.

Figure 9D:
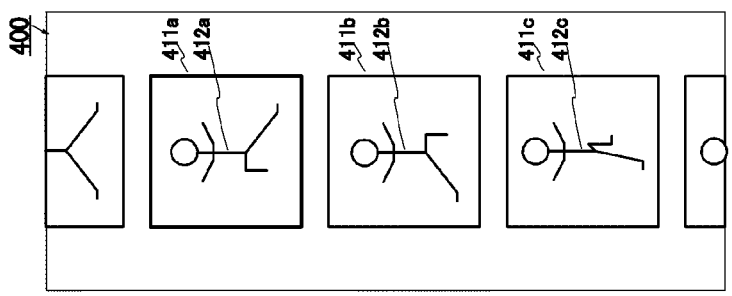
FIG. 9D is an illustration showing a forth step of the chronologically changed game image according to Embodiment 3.

In FIG. 9D, the fourth beat of the measure i of the music is reproduced. The display regions 411a to 411c are scrolled as the music is reproduced in comparison with the positions in FIG. 9C. The model animated images 412a to 412c displayed in the display regions 411a to 411c display the model animated images 412 for the fourth beat of the measures i, i+1, and, i+2, respectively.

Figure 9E:
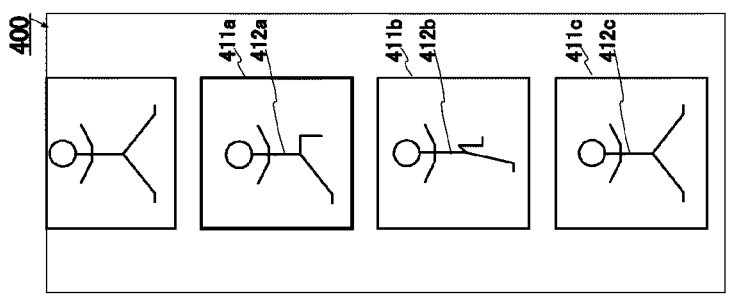
FIG. 9E is an illustration showing a fifth step of the chronologically changed game image according to Embodiment 3.

In FIG. 9E, the first beat of the measure i+1 of the music is reproduced. The display regions 411a to 411c are moved to the same positions of those in FIG. 9A, namely they are returned. On the other hand, the model animated images 412a to 412c are displayed in the display regions 411 one level higher in comparison with FIG. 9A. More specifically, the model animated image 412b is displayed in the display region 411a, the model animated image 412c is displayed in the display region 411b, and the model animated image 412a is displayed in a display region 411 one level higher than the display region 411a.

In this way, it seems to the player that the model animated images 412 keep moving along the line at a given speed. Consequently, the player can easily learn the subsequent choreographed moves or body movements to make.

As described above, in this embodiment, the instruction indicators 402 are not displayed on the screen 400. Only the display regions 411 and model animated images 412 displayed therein are displayed on the screen 400. Therefore, this embodiment is suitable for the case in which the entire move of the player is caught by an infrared camera for input of operations in executing the game instead of using the mat type controller 105.

Embodiment 4

Embodiment 4 of the present invention will be described. In Embodiment 3, the display regions 411 are scrolled as the music is reproduced. Consequently, the model animated images 412 displayed in the display regions 411 seem to be scrolled as well. In this embodiment, the display regions 411 are fixed at given positions on the screen 400, not scrolled. In this regard, details will be described below.

FIGS. 10A to 10E are illustrations showing chronologically changed game images according to Embodiment 4. As in FIGS. 6A to 6E, 8A to 8E, and 9A to 9E, FIGS. 10A to 10E show the screen 400 changed on each beat of music having four beats per measure. More specifically, FIG. 10A corresponds to the first beat of a measure (a measure i) of a piece of music being reproduced, FIG. 10B corresponds to the second beat of the same measure, FIG. 10C corresponds to the third beat of the same measure, FIG. 10D corresponds to the fourth beat of the same measure, and the FIG. 10E corresponds to the first beat of the next measure (a measure i+1).

In FIG. 10A, the first beat of a measure i of a piece of music is reproduced. The model animated image 412a displayed in the display region 411a displays a model animated image 412a for the first beat of the measure i, namely a model animated image 412a presenting a move of the player stepping on the left of the mat type controller 105 with the left foot. Similarly, the model animated image 412b displayed in the display region 411b displays a model animated image 412b for the first beat of the measure i+1. The model animated image 412c displayed in the display region 411c displays a model animated image 412c for the first beat of the measure i+2.

In FIG. 10B, the second beat of the measure i of the music is reproduced. Here, the display regions 411a to 411c stay at the same positions as in FIG. 10A. The model animated images 412a to 412c displayed in the display regions 411a to 411c also stay in the same positions as in FIG. 10A. The model animated image 412a displayed in the display region 411a displays a model animated image 412a for the second beat of the measure i, namely a model animated image 412a presenting a move of the player stepping on the right of the mat type controller 105 with the right foot. Similarly, the model animated image 412b displayed in the display region 411b displays a model animated image 412b for the second beat of the measure i+1. The model animated image 412c displayed in the display region 411c displays a model animated image 412c for the second beat of the measure i+2.

In FIG. 10C, the third beat of the measure i of the music is reproduced. The display regions 411a to 411c stay in the same positions as in FIGS. 10A and 10B. The model animated images 412a to 412c displayed in the display regions 411a to 411c also stay in the same positions as in FIG. 10B and display the model animated images 412 for the third beat of the measures i, i+1, and, i+2, respectively.

In FIG. 10D, the fourth beat of the measure i of the music is reproduced. The display regions 411a to 411c stay in the same positions as in FIGS. 10A to 10C. The model animated images 412a to 412c displayed in the display regions 411a to 411c also stay in the same positions as in FIG. 10C and display the model animated images 412 for the fourth beat of the measures i, i+1, and, i+2, respectively.

In FIG. 10E, the first beat of the measure i+1 of the music is reproduced. The display regions 411a to 411c stay in the same positions as in FIGS. 10A to 10D. On the other hand, the model animated images 412a to 412c are moved up to the display regions one level higher in comparison with FIGS. 10A to 10D. More specifically, the model animated image 412b is moved to the display region 411a, the model animated image 412c is moved to the display region 411b, and the model animated image 412a is moved to a display region 411 one level higher than the display region 411a.

Consequently, the model animated image 412 associated with the measure currently being reproduced is displayed in the display region 411a always fixed on the screen 400.

As described above, in this embodiment, the instruction indicators 402 are not displayed on the screen 400. Only the display regions 411 and model animated images 412 displayed therein are displayed on the screen 400. Furthermore, the display regions 411 are fixed at given positions on the screen 400, not scrolled. Therefore, this embodiment is suitable, for example, for the case in which the entire move of the player is caught by an infrared camera for input of operations in executing the game instead of using the mat type controller 105. The player can properly learn the moves to make from the model animated images 412 without moving his/her line of sight.

Embodiment 5

Embodiment 5 of the present invention will be described. In the above Embodiments 1 to 4, multiple display regions 411 are vertically lined up from the top to bottom on the screen 400. In this embodiment, they are horizontally lined up from the left to right. In this regard, details will be described below.

FIGS. 11A to 11E are illustrations showing exemplary game images according to Embodiment 5. As in FIGS. 6A to 6E, 8A to 8E, 9A to 9E, and 10A to 10E, FIGS. 11A to 11E show the screen 400 changed on each beat of music having four beats per measure. As for the model animated images 412 displayed in the display regions 411a, 411b, and 411c, the display region 411b displays a model animated image 412 associated with the music one measure ahead of the display region 411a and the display region 411c displays a model animated image 412 associated with the music one measure ahead of the display region 411b.

In these figures, multiple display regions 411 are lined up from the left to right on the screen 400. The display region 411a is larger and intensified in comparison with the other display regions 411b and 411c. The other characteristics are the same as those in FIGS. 10A to 10E and their detailed explanation is omitted here.

The display regions 411 of this embodiment may be scrolled as the music is reproduced in the same manner as the display regions 411 of Embodiment 3, or may not be scrolled as the music is reproduced in the same manner as the display regions 411 of Embodiment 4. Furthermore, the instruction indicators 402 may be displayed on the screen 400 as in Embodiment 1 or 2.

With the above configuration, in this embodiment, multiple display regions 411 are lined up from the left to right on the screen 400, properly displaying on the screen 400 the moves to be made by the player in time with reproduction of the music, whereby the player can learn the subsequent choreographed moves or body movements to make.

Embodiment 6

Embodiment 6 of the present invention will be described. In Embodiments 1 to 5, the model animated images 412 presenting the moves to be made by the player are displayed in the display regions 411 on the screen 400. In this embodiment, animated images of the mat type controller 105, not the model animated images 412, are displayed. In this regard, details will be described hereafter.

Figure 12:
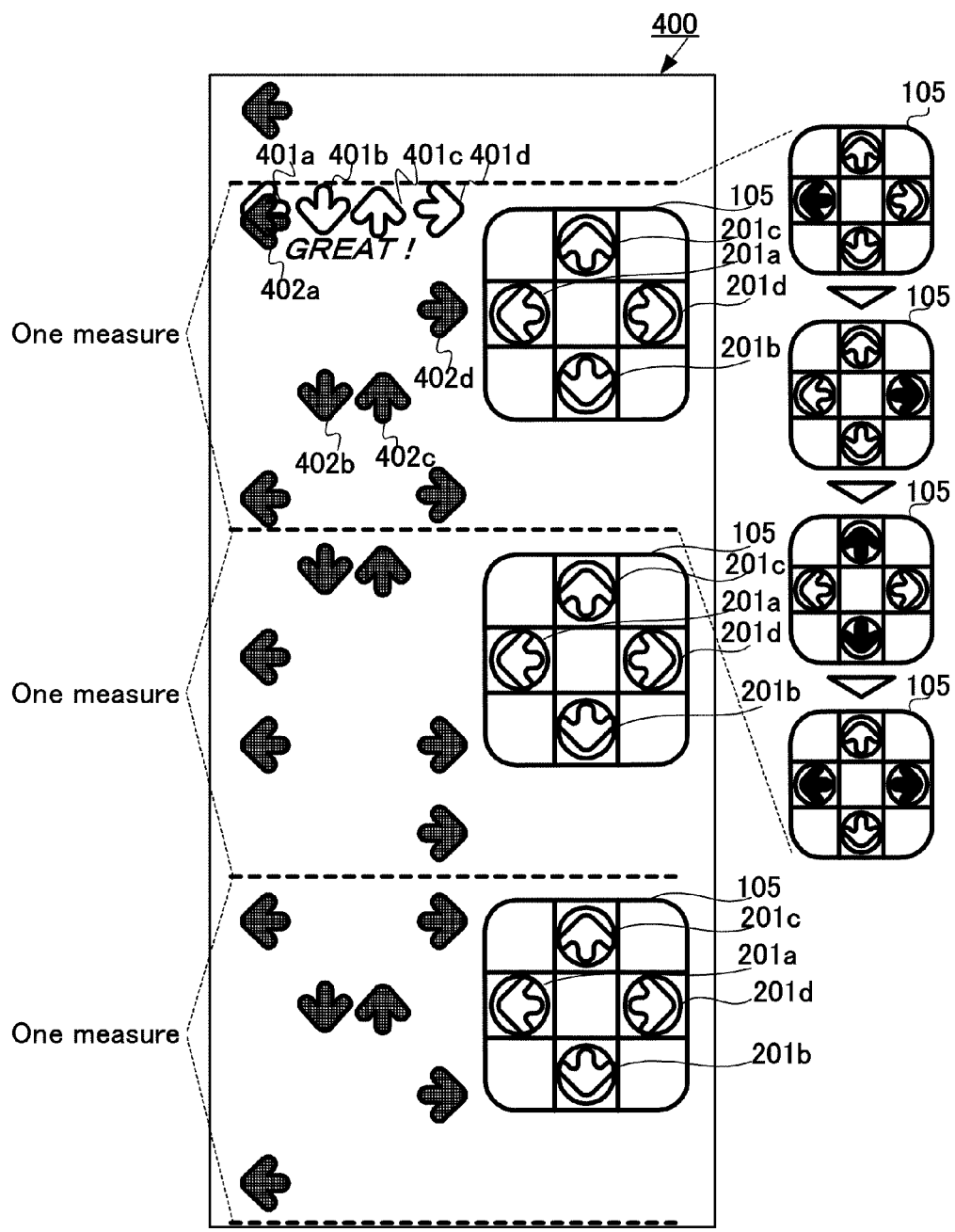
FIG. 12 is an illustration showing exemplary game images according to Embodiment 6.

FIG. 12 is an illustration showing exemplary game images according to Embodiment 6. As in FIG. 4, the reference indicators 401 depicted at fixed given positions on the screen 400 and the instruction indicators 402 depicted at positions moving with time are displayed on the screen 400. In FIG. 4, the model animated images 412 presenting the moves to be made by the player in time with reproduction of music are displayed in the display regions 411. In FIG. 12, animated images of the mat type controller 105 are displayed in the display regions 411.

As in FIG. 4, the animated images of the mat type controller 105 are associated with the segments each corresponding to a measure of a piece of music. The animated images each suggest the moves to be made by the player during the corresponding measure by highlighting the buttons on the mat type controller 105. More specifically, for the top measure in FIG. 12, the instruction indicators 402 indicate the left, the right, and the up and down, and the left and right for the first, second, third, and fourth beats, respectively. Therefore, the button 201a of the mat type controller 105 that corresponds to the left is highlighted on the first beat, the button 201d of the mat type controller 105 that corresponds to the right is highlighted on the second beat, the buttons 201c and 201b of the mat type controller 105 that correspond to the up and down are simultaneously highlighted on the third beat, and the buttons 201a and 201d of the mat type controller 105 that correspond to the left and right are simultaneously highlighted on the fourth beat.

The animated images of the mat type controller 105 in this embodiment may be scrolled as the music is reproduced in the same manner as the display regions 411 in Embodiment 1 or 3. Alternatively, they may not be scrolled as the music is reproduced in the same manner as the display regions 411 in Embodiment 2 or 4. Alternatively, the instruction indicators 402 may be displayed on the screen 400 as in Embodiment 1 or 2 or may not be displayed on the screen 400 as in Embodiment 3 or 4. Alternatively, the display regions 411 may be horizontally lined up on the screen 400 as in Embodiment 5.

In this embodiment, the model animated images 412 are not displayed on the screen 400 but the animated images of the mat type controller 105 are displayed. Therefore, the player can learn the moves of stepping on the mat type controller 105 in a more direct manner in the case of the mat type controller 105 being used.

Embodiment 7

Embodiment 7 of the present invention will be described. In Embodiments 1 to 6, the model animated images 412 displayed in multiple display regions 411 on the screen 400 are all reproduced at the same speed as reproduction of music. In this embodiment, the model animated images 412 may be reproduced at different speeds depending on the display regions in which they are displayed.

For example, the model animated image 412 displayed in the first display region 411 is reproduced at the same speed as reproduction of a piece of music; the model animated image 412 displayed in the second display region 411 is reproduced at a speed 1.5 times faster than the reproduction speed of the music; and the model animated image 412 displayed in the third display region 411 is reproduced at a speed two times faster than the reproduction speed of the music.

The reproduction speed of the model animated images 412 is not restricted to the speeds 1.5 or two times faster than the reproduction speed of music as described above. The reproduction speed can be increased to any extent. It can be 3 and 5 times faster in the second and third display regions 411, respectively, or two times faster in all of the second and subsequent display regions 411.

In this embodiment, the player can learn the subsequent choreographed moves or body movements to make at faster reproduction speeds many times.

Embodiment 8

Embodiment 8 of the present invention will be described. In Embodiments 1 to 7, the model animated images 412 are displayed in multiple display regions 411 on the screen 400. In this embodiment, still images, not animated images, are displayed in multiple display regions 411. In this regard, details will be described hereafter.

Figure 13:
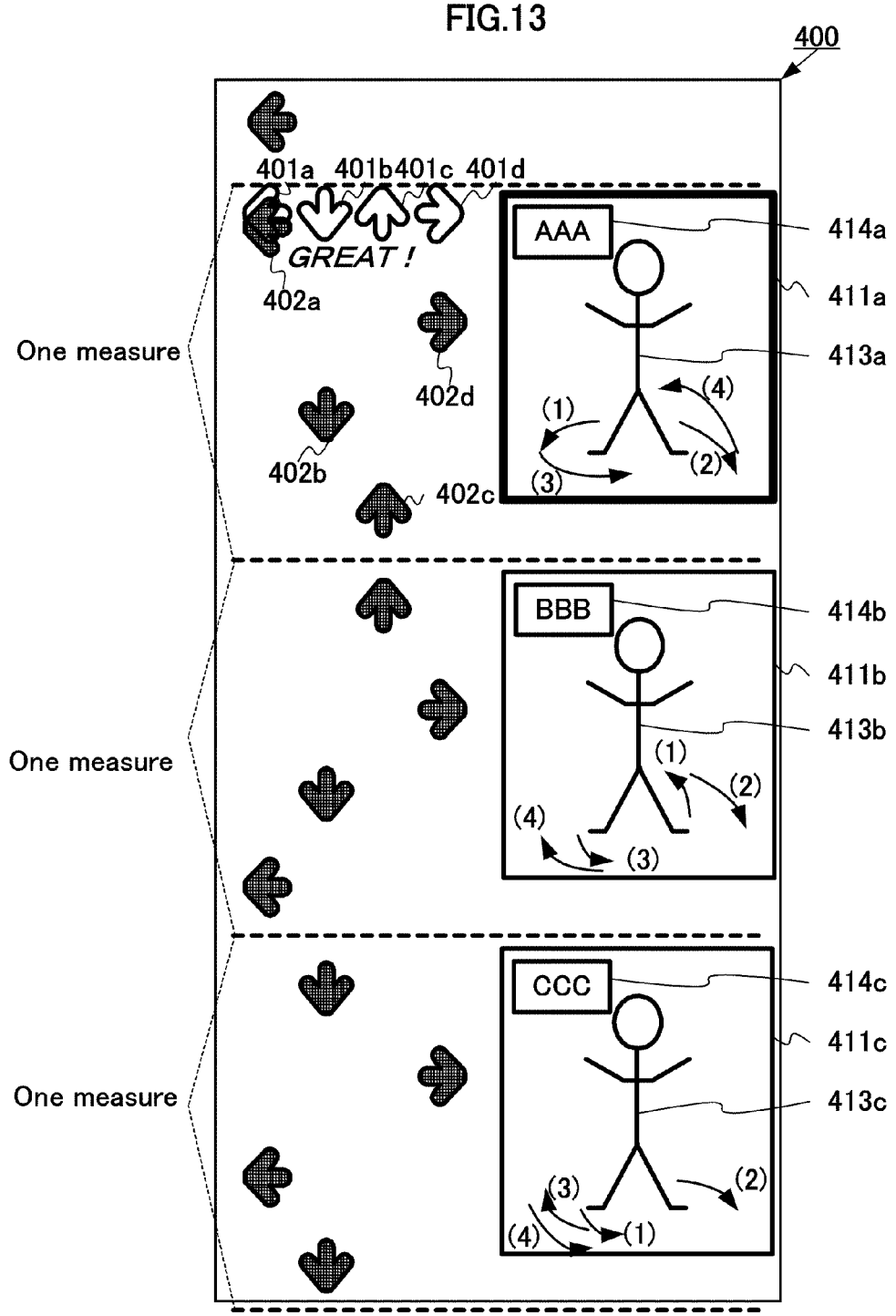
FIG. 13 is an illustration showing exemplary game images according to Embodiment 8.

FIG. 13 is an illustration showing exemplary game images according to Embodiment 8. As in FIGS. 4 and 12, the reference indicators 401 depicted at fixed given positions on the screen 400 and the instruction indicators 402 depicted at positions moving with time are displayed on the screen 400. In FIG. 4, the model animated images 412 presenting the moves to be made by the player in time with reproduction of music are displayed in the display regions 411. Here, mode still images 413 are displayed in the display regions 411.

The model still images 413 are still images presenting moves to be made by the player. In other words, this embodiment utilizes still images that do not change with time to present the moves of the player while Embodiments 1 to 7 utilize animated images to present the moves of the player.

The model still images 413 are associated with measures composing a piece of music as the model animated images 412 in Embodiments 1 to 7. More specifically, in FIG. 13, associated with the top measure, next measure, and bottom measure, respectively, model still images 413a, 413b, and 413c are displayed in the displayed regions 411a to 411c on the screen 400.

In order to present the moves to be made by the player during the corresponding measure, the model still images 413a to 413c show in what order the player should press the buttons 201a to 201d of the mat type controller 105. The model still images 413a to 413c in FIG. 13 show the arrows presenting the steps and the numbers given to the arrows so as to present the steps to be made by the player. The shown numbers correspond, for example, to the beats in that measure. The arrow having a number (1) presents the move on the first beat; the arrow having a number (2), the move on the second beat; the arrow having a number (3), the move on the third beat; and the arrow having a number (4), the move on the fourth beat.

More specifically, the model still image 413a presents:

(1) a move of the player stepping on the left of the mat type controller 105 with the left foot on the first beat;

(2) a move of the player stepping on the right of the mat type controller 105 with the right foot on the second beat;

(3) a move of the player stepping on the bottom of the mat type controller 105 with the left foot on the third beat; and (4) a move of the player stepping on the top of the mat type controller 105 with the right foot on the fourth beat.

The model still image 413b presents:

(1) a move of the player stepping on the top of the mat type controller 105 with the right foot on the first beat;

(2) a move of the player stepping on the right of the mat type controller 105 with the right foot on the second beat;

(3) a move of the player stepping on the bottom of the mat type controller 105 with the left foot on the third beat; and (4) a move of the player stepping on the left of the mat type controller 105 with the left foot on the fourth beat.

The model still image 413c presents:

(1) a move of the player stepping on the bottom of the mat type controller 105 with the left foot on the first beat;

(2) a move of the player stepping on the right of the mat type controller 105 with the right foot on the second beat;

(3) a move of the player stepping on the left of the mat type controller 105 with the left foot on the third beat; and (4) a move of the player stepping on the bottom of the mat type controller 105 with the left foot on the fourth beat.

Furthermore, the model still images 413a to 413c in FIG. 13 are given choreography names 414a to 414c ("AAA," "BBB," and "CCC"). The choreography names 414a to 414c are the names of foot moves (dance steps) in the model still images 413a to 413c. For example, assuming that the move shown in the model still image 413a is a dance step called "AAA," the move shown in the model still image 413b is a dance step called "BBB," and the move shown in the model still image 413c is a dance step called "CCC," they are displayed in the corners of the model still images 413a to 413c (the display regions 411a to 411c), respectively.

In this way, the model still images 413a to 413c and choreography names 414a to 414c are displayed during each measure composing a piece of music to be reproduced, whereby the player can learn what body movement or choreographed move to make during that measure.

The display regions 411 in which the model still images 413 are displayed in this embodiment may be scrolled as the music is reproduced in the same manner as the display regions 411 of Embodiment 1 or 3. Alternatively, they may not be scrolled as the music is reproduced in the same manner as the display regions 411 of Embodiment 2 or 4. Alternatively, the instruction indicators 402 may be displayed on the screen 400 as in Embodiment 1 or 2 or may not be displayed on the screen 400 as in Embodiment 3 or 4. Alternatively, the display regions 411 may be horizontally lined up on the screen 400 as in Embodiment 5.

As described above, in this embodiment, the model animated images 412 are not displayed in the display regions 411 on the screen 400; instead, the model still images 413 are displayed. In this way, compared with use of animated images, it is easier to teach the moves to the player where one does not want to take so much time to reproduce animated images, there is no need of specific presentation by animated images, or it is desired to reduce the game processing load.

In the above Embodiments 1 to 8, three display regions 411 are mainly provided on the screen 400. In the present invention, the number of display regions is not restricted thereto and two, five, or more display regions 411 can be provided on the screen 400.

As described above, the present invention can provide a game apparatus, game processing method, and information recording medium suitable for properly displaying on a screen moves to be made by the player in time with reproduction of a piece of music.

Having described and illustrated the principles of this application by reference to one (or more) embodiment(s), it should be apparent that the embodiments described herein may be modified in arrangement and detail without departing from the principles disclosed herein and that it is intended that the application be construed as including all such modifications and variations insofar as they come within the spirit and scope of the subject matter disclosed herein.

What is claimed is:

1. A game apparatus displaying on a screen moves to be made by a player in time with reproduction of a piece of music, wherein said piece of music is divided into multiple segments of the same length of time, each segment corresponding to a measure of said piece of music, each measure having a plurality of beats, said game apparatus comprising:

a reproduction part reproducing said music by sequentially reproducing each segment in turn, each segment has an associated set of game images, each set of game images including at least one instruction indicator and an animated image; and a display part displaying multiple sets of the game images on the screen at the same time, wherein each of the sets of displayed game images is deemed active when its associated segment is being played, wherein each instruction indicator is associated with one of the beats, wherein the animated image of each set of game images includes a plurality of still images, each still image being associated with one of the beats of the associated segment, and wherein the animated image is animated by displaying each still image, in turn and in time with the beats of the associated segment to present moves to be made by said player while the respective set of game images is active.

2. The game apparatus according to claim 1, wherein each set of game images includes a plurality of instruction indicators.

3. The game apparatus according to claim 1, wherein each set of game images is associated with a corresponding region on the screen, said multiple regions are lined up on said screen in order.

4. The game apparatus according to claim 3, wherein said multiple regions move at a given speed along said line while said active segment is reproduced by said reproduction part and, when said reproduction of said segment is over, move to positions where they were when said reproduction of said segment started.

5. The game apparatus according to claim 1, wherein said display part displays a first region among said multiple regions in an intensified manner.

6. The game apparatus according to claim 1 wherein the animated image corresponding to the active set of game images is played at a normal speed, the normal speed being synchronized with the corresponding segment of music and wherein other animated images displayed on the screen are animated at a speed different from the normal speed.

7. The game apparatus according to claim 6 wherein the speed different from the normal speed is faster than the normal speed.

8. A game processing method executed in a game apparatus displaying on a screen moves to be made by a player in time with reproduction of a piece of music, wherein said piece of music is divided into multiple segments of the same length of time, each segment corresponding to a measure of said piece of music, each measure having a plurality of beats, said game apparatus has a reproduction part and a display part the method including the steps of:

a reproduction step performed by said reproduction part, of reproducing said music by sequentially reproducing each segment in turn, each segment has an associated set of game images, each set of game images including at least one instruction indicator and an animated image; and a display step, performed by said display part, of displaying multiple sets of the game images on the screen at the same time, wherein each of the sets of displayed game images is deemed active when its associated segment is being played, wherein each instruction indicator is associated with one of the beats, wherein the animated image of each set of game images includes a plurality of still images, each still image being associated with one of the beats of the associated segment, and wherein the animated image is animated by displaying each still image, in turn and in time with the beats of the associated segment, to present moves to be made by said player while the respective set of game images is active.

9. The game processing method according to claim 8 wherein the animated image corresponding to the active set of game images is played at a normal speed, the normal speed being synchronized with the corresponding segment of music, the display step including the step of displaying other animated images at a speed different from the normal speed.

10. The game processing according to claim 9 wherein the speed different from the normal speed is faster than the normal speed.

11. A non-transitory computer-readable information recording medium in which recorded are programs that allow a computer to function as a game apparatus displaying on a screen moves to be made by a player in time with reproduction of a piece of music, wherein said piece of music is divided into multiple segments of the same length of time, each segment corresponding to a measure of said piece of music, each measure having a plurality of beats, said programs allow said computer to function as:

a reproduction part reproducing said music by sequentially reproducing each segment in turn, each segment has an associated set of game images, each set of game images including at least one instruction indicator and an animated image; and a display part displaying multiple sets of the game images on the screen at the same time, wherein each of the sets of displayed game images is deemed active when its associated segment is being played, wherein each instruction indicator is associated with one of the beats, wherein the animated image of each set of game images includes a plurality of still images, each still image being associated with one of the beats of the associated segment, and wherein the animated image is animated by displaying each still image, in turn and in time with the beats of the associated segment, to present moves to be made by said player while the respective set of game images is active.

12. The non-transitory computer-readable information recording medium according to claim 11 wherein the animated image corresponding to the active set of game images is played at a normal speed, the normal speed being synchronized with the corresponding segment of music and wherein other animated images displayed on the screen are animated at a speed different from the normal speed.

13. The non-transitory computer-readable information recording medium according to claim 12 wherein the speed different from the normal speed is faster than the normal speed.

* * * * *